United States Patent [19]

Fujita et al.

[11] Patent Number: 4,678,768
[45] Date of Patent: * Jul. 7, 1987

[54] CATALYST COMPONENT FOR POLYMERIZATION OF OLEFINS

[75] Inventors: Masahito Fujita; Makoto Miyazaki; Masami Kizaki; Yukio Nagashima, all of Saitama; Yuichi Shimbori, Kanagawa, all of Japan

[73] Assignee: Toa Nenryo Kogyo Kabushiki Kaisha, Tokyo, Japan

[*] Notice: The portion of the term of this patent subsequent to Oct. 29, 2002 has been disclaimed.

[21] Appl. No.: 747,618

[22] Filed: Jun. 21, 1985

[30] Foreign Application Priority Data

Jun. 21, 1984 [JP] Japan ................................. 59-126378

[51] Int. Cl.$^4$ ............................................. C08F 4/64
[52] U.S. Cl. ................................... 502/119; 502/112; 502/118; 502/125; 502/127; 502/128; 502/129; 502/130; 502/131; 502/132; 526/124; 526/125

[58] Field of Search ............... 502/112, 118, 119, 125, 502/127, 128, 129, 130, 131, 132

[56] References Cited

U.S. PATENT DOCUMENTS

| 3,135,809 | 6/1964 | Bosmajian | 502/103 X |
| 4,544,648 | 10/1985 | Nomura et al. | 502/119 |
| 4,550,095 | 10/1985 | Imai et al. | 502/119 |
| 4,551,440 | 11/1985 | Imai et al. | 502/119 |
| 4,552,858 | 11/1985 | Imai et al. | 502/112 |

Primary Examiner—Patrick P. Garvin
Attorney, Agent, or Firm—M. B. Kurtzman

[57] ABSTRACT

A catalyst component for polymerization of olefins which is prepared by contacting a product obtained by contacting (A) a magnesium alkoxide, (B) a silicon compound having the hydrogen-silicon bond, and (C) a titanium compound with one another, with (D) (a) a hydrocarbon, (b) a halogenated hydrocarbon, and/or (c) a halide of an element selected from the elements of Groups IIIa, IVa, and Va of the Periodic Table.

25 Claims, No Drawings

CATALYST COMPONENT FOR POLYMERIZATION OF OLEFINS

DETAILED DESCRIPTION OF INVENTION

1. Field of the Invention

The present invention relates to a catalyst component for polymerization of olefins. More particularly, it relates to a catalyst component which makes it possible to produce an olefin polymer of high stereoregularity and high bulk density in high yields.

2. Background Technology

It is known that a contact product of a halogen-free magnesium compound and a titanium compound is effective as a catalyst component for polymerization of olefins, although poor in catalytic activity. There have been several attempts to improve such catalyst components. The attempts at improvement include a process of contacting Mg(OR)$_2$ and a titanium tetrahalide with each other in the presence of a halosilane of the formula $SiX_lR_{4-l}$ or in the presence of said halosilane and an electron donor compound (Japanese Patent Laid-open No. 98076/1977), or a process of contacting a magnesium compound having the Mg—O—R bond and a halogenating agent such as a silicon compound of the formula $X_mSiR_n$ with each other in the presence of an electron donor compound (or in the absence of it but in the presence of it afterward) (Japanese Patent Laid-open No. 43094/1978). It has been attempted to improve the solid catalyst components by using an aluminum halide as an essential reactant by contacting a solid reaction product of an aluminum halide, an organic compound having the Si—O bond, and a magnesium alcoholate with a tetravalent titanium compound having at least one halogen atom (Japanese Patent Laid-open No 78287/1978). Yet another process has been provided comprising reacting a reaction product of a magnesium compound, a titanium compound, and a silicon compound with at least one aluminum halide compound (Japanese Patent Laid-open No. 155205/1981).

The catalyst components prepared according to the above-mentioned processes have some disadvantages. Such disadvantages include poor catalytic activity and the production of polymers which are poor in stereoregularity and low in bulk density.

In addition, there is known a catalyst component for polymerization of olefins which is prepared by contacting a magnesium compound, an electron donor compound, a silicon compound having the Si—H bond, and a titanium halide compound with one another (Japanese Laid-open No. 92009/1982.). According to this disclosure, the magnesium compound is practically a magnesium halide and the silicon compound and the titanium halide are used for contact simultaneously. Thus, it is not satisfactory in its performance.

If the catalyst component is to be used in a high-activity catalyst and in a process that requires no deashing, it is necessary to keep low the quantity of ash remaining in the polymer formed and the quantity of modifier such as an ester which gives rise to an odor. To meet this requirement, the catalyst component should have a high catalytic activity, and it is also necessary that the catalyst contain as little titanium as possible and yet keep a high activity and an ability to produce a polymer of high stereoregularity even when an organoaluminum compound and a modifier are used only in small quantities at the time of polymerization. The conventional catalyst, however, has a tendency that as the amount of organoaluminum compound in the catalyst decreases, the stereoregularity of the resulting polymer also decreases.

Also, a catalyst component has been provided which obtains in high yields olefin polymers having a high stereoregularity and a high bulk density. This catalyst component is prepared by contacting a magnesium alkoxide, a silicon compound having the hydrogen-silicon bond, an electron donor compound, and a titanium compound with one another (Japanese Patent Laid-open No. 198503/1983). This catalyst component, however, has a drawback that it must be used, at the time of polymerization, in combination with as much organoaluminum compound as is required for the conventional catalyst component.

DISCLOSURE OF THE INVENTION

OBJECT OF THE INVENTION

It is an object of this invention to provide a catalyst compnent of high catalytic activity which makes it possible to produce an olefin polymer of high stereoregularity and high bulk density even when the amount of organoaluminum compound cocatalyst is reduced at the time of polymerization. In accordance with this invention, it has been found that the catalyst component can be obtained by contacting a magnesium alkoxide, a silicon compound having the silicon-hydrogen bond, and a titanium compound with one another, and then contacting the resulting product with a hydrocarbon or a specific halogen-containing compound.

SUMMARY OF THE INVENTION

The gist of this invention resides in a catalyst component for polymerization of olefins which is prepared by contacting a product obtained by contacting (A) a magnesium alkoxide, (B) a silicon compound having the hydrogen-silicon bond, and (C) a titanium compound with one another, with (D) (a) a hydrocarbon, (b) a halogenated hydrocarbon, carbon, and/or (c) a halide of an element selected from the elements of Groups IIIa, IVa, and Va of the Periodic Table.

The ingredients used for preparing the catalyst component of this invention include:

(A) Magnesium alkoxide

The magnesium alkoxide used in this invention is one which is represented by the formula Mg(OR)(OR'), where R and R' are $C_1$ to $C_{20}$, preferably $C_1$ to $C_{10}$ alkyl, alkenyl, cycloalkyl, aryl, or aralkyl groups, and R and R' may be the same or different.

Examples of this compound include $Mg(OCH_3)_2$, $Mg(OC_2H_5)_2$, $Mg(OCH_3)(OC_2H_5)$, $Mg(Oi-C_3H_7)_2$, $Mg(OC_3H_7)_2$, $Mg(OH_4H_9)_2$, $Mg(Oi-C_4H_9)_2$, $Mg(OC_4H_9)(Oi-C_4H_9)$, $Mg(OC_4H_9)(Osec-C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)$, and $Mg(OCH_2C_6H_5)_2$.

The magnesium alkoxide should preferably be dried before use, and more preferably be dried with heating under reduced pressure. Any commercially available one may be used as such, or a desired compound may be synthesized according to the known method.

Prior to use, the magnesium alkoxide may be brought into contact with an inorganic or organic inert solid substance. Suitable examples of an inorganic solid substance include metal compounds in the form of sulfate, hydroxide, carbonate, phosphate, or silicate, such as $Mg(OH)_2$, $BaCO_3$, and $Ca(PO_4)_2$. Examples of an organic solid substance include low-molecular weight compounds of aromatic hydrocarbons such as durene, anthracene, naphthalene, and diphenyl, and high-molecular weight compounds such as polyethylene, polypropylene, polyvinyltoluene, polystyrene, polymethyl methacrylate, polyamide, polyester, and polyvinyl chloride.

(B) Silicon compound

The silicon compound used in this invention is not specifically limited so long as it has the hydrogen-silicon bond. It is a compound represented by the formula $H_mR_n{}^1SiX_r$—(where $R^1$ is a hydrocarbon group), $R^2O$—(where $R^2$ is a hydrocarbon group), $R^3R^4N$ (where $R^3$ and $R^4$ are hydrocarbon groups), or $R^5COO$—(where $R^5$ is a hydrogen atom or hydrocarbon group); X is a halogen atom; and m is an integer of 1 to 3, $0 \leq r < 4$, and $m+n+r=4$. (The groups represented by R may be the same or different when n is greater than 1.)

The hydrocarbon groups represented by $R^1$, $R^2$, $R^3$, $R^4$, and $R^5$ are $C_1$ to $C_{16}$ alkyl, alkenyl, cycloalkyl, aryl, and aralkyl groups. The alkyl group includes methyl, ethyl, propyl, n-butyl, isobutyl, n-hexyl, n-octyl, 2-ethylhexyl, and n-decyl groups. The alkenyl groups includes vinyl, allyl, isopropenyl, propenyl, and butenyl groups. The cycloalkyl group includes cyclopentyl and cyclohexyl groups. The aryl group includes phenyl, tolyl, and xylyl groups. The aralkyl includes benzyl, phenethyl, and phenylpropyl groups.

Preferable among the above-mentioned hydrocarbon groups are lower alkyl such as methyl, ethyl, propyl, isopropyl, n-butyl, isobutyl, and t-butyl, and aryl such as phenyl and tolyl.

X in the above formula denotes a halogen atom such as chlorine, bromine, and iodine. X is preferably a chlorine atom.

Examples of the silicon compound include $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2(C_2H_5)SiCl$, $H_2(n-C_4H_9)SiCl$, $H_2(C_6H_4CH_3)SiCl$, $HSi(CH_3)_3$, $HSiCH_3(OCH_3)_2$, $HSiCH_3(OC_2H_5)_2$, $HSi(OCH_3)_3$, $(C_2H_5)_2SiH_2$, $HSi(CH_3)_2(OC_2H_5)$, $HSi(CH_3)_2[N(CH_3)_2]$, $HSiCH_3(C_2H_5)_2$, $HSiC_2H_5(OC_2H_5)_2$, $HSiCH_3[N(CH_3)_2]_2$, $C_6H_5SiH_3$, $HSi(C_2H_5)_3$, $HSi(OC_2H_5)_3$, $HSi(CH_3)_2[N(C_2H_5)_2]$, $HSi[N(CH_3)_2]_3$, $C_6H_5CH_2SiH_2$, $C_6H_5(CH_3)_2SiH$, $(n-C_3H_7)_3SiH$, $HSiCl(C_6H_5)_2$, $H_2Si(C_6H_5)_2$, $HSi(C_6H_5)_2CH_3$, $(n-C_5H_{11}O)_3SiH$, $HSi(C_6H_5)_3$, and $(n-C_5H_{11})_3SiH$. Other silicon compounds not covered by the above formula include $(ClCH_2CH_2O)_2CH_3SiH$, $HSi(OCH_2CH_2Cl)_3$, $[H(CH_3)_2Si]_2O$, $[H(CH_3)_2Si]_2NH$, $(CH_3)_3SiOSi(CH_3)_2H$, $[H(CH_3)_2C_6H_4$, $[H(CH_3)_2SiO]_2Si(CH_3)_2$, $[(CH_3)_3SiO]_2SiHCH_3$, $[(CH_3)_3SiO]_3SiH$, and

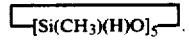

Preferable among the above-mentioned halogenated silicon compounds are those represented by the formula in which R is a hydrocarbon, n is an integer of 0 to 2, and r is an integer of 1 to 3. Preferred examples of such compounds are $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, and $HSiCl(C_6H_5)_2$. Particularly preferable are $HSiCl_3$, $HCH_3SiCl_2$, and $H(CH_3)_2SiCl$.

(C) Titanium compound

The titanium compound used in this invention is a compound of divalent, trivalent, or tetravalent titanium. Examples of the compound include titanium tetrachloride, titanium tetrabromide, trichloroethoxytitanium, trichlorobutoxytitanium, dichlorodiethyoxytitanium, dichlorodibutoxytitanium, dichlorodiphenoxytitanium, chlorotriethoxytitanium, chlorotributoxytitanium, tetrabutoxytitanium, and titanium trichloride. Preferable among them are tetravalent titanium halides such as titanium tetrachloride, trichloroethoxytitanium, dichlorodibutoxytitanium, and dichlorodiphenoxytitanium. Particularly preferable is titanium tetrachloride.

(D) Hydrocarbon, halogenated hydrocarbon, and halide of an element of Groups IIIa, IVa, and Va of the Periodic Table.

The hydrocarbon used in this invention includes aliphatic, alicyclic, and aromatic hydrocarbons. Their examples are n-hexane, methylhexane, dimethylhexane, ethylhexane, ethylmethylpentane, n-heptane, methylheptane, trimethylpentane, dimethylheptane, ethylheptane, trimethylhexane, trimethylheptane, n-octane, methyloctane, dimethyloctane, n-undecane, n-dodecane, n-tridecane, n-tetradecane, n-pentadecane, n-hexadecane, n-octadecane, n-nonadecane, n-eicosane, cyclopentane, cylcohexane, methylcyclopentane, cycloheptane, dimethylcyclopentane, methylcyclohexane, ethylcyclopentane, dimethylcyclohexane, ethylcyclohexane, cyclooctane, indane, n-butylcyclohexane, isobutylcyclohexane, adamantane, benzene, toluene, xylene, ethylbenzene, tetramethylbenzene, n-butylbenzene, isobutylbenzene, propyltoluene, decalin and tetralin.

The halogenated hydrocarbon used in this invention includes mono or polyhalogen substituted compounds of $C_1$ to $C_{12}$ saturated or unsaturated aliphatic, alicyclic, or aromatic hydrocarbons. Illustrative examples derived from an aliphatic compound are methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichlorethane, 1,2-dibromoethane, 1,2-di-iodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane, and chlorinated paraffin. The examples derived from an alicyclic compound are chlorocyclopropane, tetrachlorocyclopentane, hexachloropentadiene, and hexachlorocyclohexane. The examples derived from an aromatic compound are chlorobenzene, bromobenzene, o-dichlorobenzene, p-dichlorobenzene, hexachlorobenzene, hexabromobenzene, benzotrichloride, and p-chlorobenzotrichloride. These compounds may be used individually or in combination with one another.

The halide of an element selected from the group of elements in Groups IIIa, IVa, and Va of the Periodic Table (called a metal halide hereinafter) includes the chloride, fluoride, bromide, and iodide of B, Al, Ga, In, Tl, Si, Ge, Sn, Pb, As, Sb, and Bi. Preferred examples of the metal halide are $BCl_3$, $BBr_3$, $BI_3$, $AlCl_3$, $AlBr_3$, $AlI_3$, $GaCl_3$, $GaBr_3$, $InCl_3$, $TiCl_3$, $SiCl_4$, $SnCl_4$, $SbCl_5$, and $SbF_5$.

Preparation of Catalyst Component

The catalyst component of this invention is obtained by contacting a magnesium alkoxide (constituent A), a silicon compound having the hydrogen-silicon bond (constituent B), and a titanium compound (constituent C) with one another, and then contacting the resulting product with a hydrocarbon, halogenated hydrocarbon, and/or metal halide (constituent D).

Contacting of constituents A, B, and C

The contacting of constituents A, B, and C may be accomplished in two ways: (1) Constituents A and B are brought into contact with each other and then the resulting product is brought into contact with constituent C. (2) Constituents A, B, and C are brought into contact with one another all at once. The former method is preferable. A detailed description about it is given below.

(i) Contacting of Constituents A and B

The contacting of constituents A and B is accomplished by mixing and stirring or mechanically copulverizing the two constituents in the presence or absence of a hydrocarbon and/or halogenated hydrocarbon.

The hydrocarbon includes hexane, heptane, octane, cyclohexane, benzene, toluene, and xylene; and the halogenated hydrocarbon includes 1,2-dichloroethane, 1,2-dichloropropane, carbon tetrachloride, butyl chloride, isoamyl chloride, bromobenzene, and chlorotoluene.

One mol of constituent A is brought into contact with 0.5 to 10 mol, preferably 1 to 5 mol of constituent B.

The contacting by mechanical copulverization may be accomplished by using a grinder, such as rotary ball mill, vibratory ball mill, and impact mill, which is commonly used to obtain grinds. The copulverization may be accomplished, if necessary, under reduced pressure or in an inert gas atmosphere, in the substantial absence of moisture and oxygen.

In the case of mechanical copulverization, the contact temperature is 0° to 200° C. and the contact time is 0.5 to 100 hours In the case of contacting by mere stirring, the contact temperature is 0° to 200° C. and the contact time is 0.5 to 100 hours. It is possible to use two or more kinds of constituent B at the same time.

The contact product of constituent A and constituent B may be brought into contact with an electron donor compound, if necessary. The electron donor compound includes carboxylic acids, carboxylic acid esters, alcohols, ethers, ketones, amines, amides, nitriles, aldehydes, alcoholates, phosphamides, thioethers, thioesters, carbonic acid esters, and compounds of phosphorus, arsenic, or antimony attached to an organic group through a carbon or oxygen atom. Preferable among them are carboxylic acid esters, alcohols, and ethers.

Examples of the carboxylic acids include aliphatic monocarboxylic acid such as formic acid, acetic acid, propionic acid, butyric acid, isobutyric acid, valeric acid, caproic acid, pivalic acid, acrylic acid, methacrylic acid, and crotonic acid; aliphatic dicarboxylic acids such as malonic acid, succinic acid, glutaric acid, adipic acid, sebasic acid, maleic acid, and fumaric acid; aliphatic oxycarboxylic acids such as tartaric acid; alicyclic carboxylic acids such as cyclohexane monocarboxylic acid, cyclohexene monocarboxylic acid, cis-1,2-cyclohexane dicarboxylic acid, and cis-4-methylcyclohexene-1,2-dicarboxylic acid; aromatic monocarboxylic acids such as benzoic acid, toluic acid, anisic acid, p-tertiary-butylbenzoic acid, naphthoic acid, and cinnamic acid; and aromatic dicarboxylic acids such as phthalic acid, isophthalic acid, terephthalic acid, and naphthalic acid.

The above-mentioned carboxylic acids may be used in the form of an anhydride.

The carboxylic acid esters are monoesters and diesters of the above-mentioned carboxylic acids. Their examples include butyl formate, ethyl acetate, butyl butyrate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl furmarate, diethyl fumarate, diisobutyl fumarate, diethyltartrate, dibutyl tartrate, diisobutyl tartrate, ethyl cyclohexanecarbonate, methyl benzoate, ethyl benzoate, methyl p-toluylate, ethyl p-tertiary-butylbenzoate, ethyl p-anisate, ethyl alpha-naphthoate, isobutyl alpha-naphthoate, ethyl cinnamate, monomethyl phthalate, dibutyl phthalalte, diisobutyl phthalate. dihexyl phthalate, dioctyl phthalate, di-2-ethyl-hexyl phthalate, diaryl phthalate, diphenyl phthalate, diethyl isophthalate, diisobutyl isophthalate, diethyl terephthalate, dibutyl terephthalate, diethyl nepathalate, and dibutyl naphthalate.

The carboxylic acid halides that can be used in this invention are acid halides of the above-mentioned carboxylic acids. Their examples include acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, malonic acid chloride, malonic acid bromide, succinic acid chloride, succinic acid bromide, glutaric acid chloride, glutaric acid bromide, adipic acid chloride, adipic acid bromide, sebasic acid chloride, sebasic acid bromide, maleic acid chloride, maleic acid bromide, fumaric acid chloride, fumaric acid bromide tartaric acid chloride, tartaric acid bromide, cyclohexane carboxylic acid chloride, cyclohexane carboxylic acid bromide, 1-cyclohexene carboxylic acid chloride, cis-4-methylcyclohexene carboxylic acid chloride, cis-4-methylcyclohexene carboxylic acid bromide, benzoyl chloride, benzoyl bromide, p-toluic acid chloride, p-toluic acid bromide, p-anisic acid chloride, p-anisic acid bromide, alpha-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Additional compounds that can be used include dicarboxylic acid monoalkylhalides such as adipic acid monomethylchloride, maleic acid monoethylchloride, and maleic acid monomethylchloride.

The alcohols are those compounds represented by the formula $R^6OH$, where $R^6$ is a $C_1$ to $C_{12}$ alkyl, alkenyl, cycloalkyl, aryl, or aralkyl group. Examples of the alcohols include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-tertiary-butylphenol, and n-octylphenol.

The ethers are those compounds represented by the formula $R^7OR^8$, where $R^7$ and $R^8$ are $C_1$ to $C_{12}$ alkyl, alkenyl, cycloalkyl, aryl, or aralkyl groups. $R^7$ and $R^8$ may be the same or different. Examples of the ethers include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisole, and ethylphenyl ether.

The contact product of constituent A and constituent B is brought into contact with an electron donor compound, if necessary. The contact may be accomplished by mixing and stirring or mechanically copulverizing them in the presence or absence of an inert hydrocarbon. The inert hydrocarbon includes, for example, hexane, heptane, octane, cyclohexane, benzene, toluene, and xylene.

In the case of mechanical copulverization, the contact temperature is 0° to 100° C. and the contact time is 0.1 to 100 hours. In the case of contacting by mere stirring, the contact temperature is 0° to 150° C. and the contact time is 0.5 to 10 hours.

The electron donor compound should preferably be used in an amount of 0.01 to 10 gram mol, particularly 0.05 to 1 gram mol, for 1 gram atom of magnesium in the contact product of constituent A and constituent B.

The contact with an electron donor may also be accomplished in the presence of a titanium compound (constituent C). In this case, the contact product of constituent A and constituent B is brought into constituent C and an electron donor compound successively, or constituent C and an electron donor compound are previously brought into contact with each other and then the resulting contact product is brought into contact with the contact product of constituent A and constituent B.

(ii) Contacting with constituent C

The contact product of constituent A and constituent B or the contact product of said contact product with an electron donor compound (these contact products are referred to as relevant contact products hereinafter) is subsequently brought into contact with constituent C. Before being brought into contact with constituent C, the relevant contact product may be washed with a proper cleaning agent such as the above-mentioned inert hydrocarbon.

The contacting of the relevant contact product with constituent C may be accomplished by simply bringing them into contact with each other. It may also be accomplished by mixing and stirring them or mechanically copulverizing them in the presence of a hydrocarbon, halogenated hydrocarbon, and/or electron donor compound.

The hydrocarbons preferred for this use are $C_6$ to $C_{12}$ saturated aliphatic, saturated alicyclic, and aromatic hydrocarbons such as hexane, heptane, octane, cyclohexane, benzene, toluene, and xylene. The halogenated hydrocarbons that can be used are those compounds described in paragraph (D) concerning the preparation of the catalyst component. The electron donor compound is that compound which is used in the above-mentioned step in which the contact product of constituent A and constituent B is brought into contact with an electron donor compound, if necessary.

Constituent C is used in an amount of greater than 0.1 gram mol, preferably 1 to 50 gram mol, for 1 gram atom of magnesium in the relevant contact product. In the case where the contact is accomplished in the presence of a hydrocarbon, halogenated hydrocarbon, or electron donor compound, the contact temperature is 0° to 200° C., preferably 60° to 150° C., and the contact time is 0.5 to 20 hours, preferably 1 to 5 hours.

The hydrocarbon and/or halogenated hydrocarbon should be used in an amount of 10 to 300 g for 1 liter of the relevant contact product in the liquid form (hydrocarbon and/or liquid halogenated hydrocarbon and liquid titanium compound). The electron donor compound should preferably be used in an amount of 0.01 to 10 gram mol, particularly 0.05 to 1 gram mol, for 1 gram atom of magnesium in the relevant contact product. The relevant contact product may be brought into contact with the electron donor compound after the latter is previously dissolved in an inert hydrocarbon or after the latter is previously brought into contact with constituent C.

The contacting with constituent C may be performed twice or more, if necessary. In this case, the resulting contact product may be washed with a hydrocarbon and/or halogenated hydrocarbon at normal temperature or with heating during the interval between the preceding contact and the succeeding contact.

The solid product obtained as mentioned above is separated from the liquid substance, and is washed, if necessary, with an inert hydrocarbon such as hexane, heptane, octane, cyclohexane, benzene, toluene, and xylene. The product thus obtained is then brought into contact with constituent D. It may be dried prior to contacting.

Contacting with Constituent D

The product obtained by contacting constituents A, B, and C with one another (referred to as the relevant product) is then brought into contact with constituent D to give the catalyst component of this invention. One or more than one kind of constituent D may be used. In the case where constituent D is a solid substance at normal temperatures, it is preferable to use it together with a proper medium which solubilizes it.

The contacting of the relevant product with constituent D may be accomplished by mechanical copulverization. However, mixing and stirring in the presence of a medium is preferred. The contacting should be performed at 0° to 200° C. for 5 minutes to 20 hours, preferably at 10° to 120° C. for 10 minutes to 5 hours. If constituent D is a liquid substance, the relevant product should preferably be used in an amount of 1 to 1000 g for 1 liter of constituent D. If constituent D is a solid substance, it should be used in an amount of 0.01 to 100 g for 1 g of the relevant product. The contact may be performed twice or more, if necessary.

The contact product obtained as mentioned above is washed, if necessary, with an inert hydrocarbon such as hexane, heptane, octane, cyclohexane, benzene, toluene, and xylene followed by drying, to give the catalyst component of this invention.

The catalyst component of this invention is a powder having a specific surface area of 50 to 650 $m^2/g$ as measured by the BET method at the adsorption temperature of liquid nitrogen, a pore volume of 0.05 to 0.4 cc/g, and a narrow particle size distribution with uniform particle size. It is composed of 10 to 25 wt % of magnesium, 0.5 to 10 wt % of titanium, and 40 to 60 wt % of halogen, with the remainder being organic compounds. In the case where an electron donor compound is used in the preparation of the catalyst component, it is usually contained in the resulting catalyst component.

Catalyst for Polymerization of Olefins

The catalyst component of this invention is combined with an organoaluminum compound to be made into a catalyst for homopolymerization of an olefin or for copolymerization of an olefin with another olefin.

Organoaluminum Compound

The organoaluminum compound to be combined with the catalyst component for olefin polymerization is one which is represented by the formula $R_y''AlX'_{3-y}$ (where $R''$ is an alkyl group or aryl group; $X'$ is a halogen atom, alkoxy group or hydrogen atom; and $y$ is a number in the range of $1 \leq y < 3$). Preferred ones are $C_1$ to $C_{18}$, preferably $C_2$ to $C_6$ alkyl aluminum compounds and mixtures thereof and complex compounds thereof such as trialkyl aluminum, dialkyl aluminum monohalide, monoalkyl aluminum dihalide, alkyl aluminum sesquihalide, dialkyl aluminum monoalkoxide, and dialkyl aluminum monohydride. Their examples include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among these compounds is trialkyl aluminum, particularly triethyl aluminum and triisobutyl aluminum. The trialkyl aluminum may be used in combination with other organoaluminum compounds such as commercially available diethyl aluminum chloride, ethyl aluminum dichloride, ethyl aluminum sesquichloride, diethyl aluminum ethoxide, and diethyl aluminum hydride, or a mixture thereof or a complex compound thereof.

The organoaluminum may be used alone or in combination with an electron donor compound, which may be the same compound as used in the process for preparing the catalyst component in which the contact product of a magnesium alkoxide and a silicon compound is brought into contact with an electron donor compound according to demand as mentioned above. The electron donor compound that can be used may be an organosilicon compound or a compound containing a hetero atom such as nitrogen, sulfur, oxygen, and phosphorus.

Examples of the organosilicon compounds include tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methytributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, aryltrimethoxysilane, phenyltrimethoxysilane, phenyltriethoxysilane, benzyltriphenoxysilane, methyltriaryloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane. diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diaryldipropoxysilane, diphenyldiaryloxysilane, methylphenyldimethoxysilane, and chlorophenyldiethoxysilane.

Examples of the electron donor compound containing a hetero atom are given below. Those which contain a nitrogen atom include 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, metatoluidine, triethylamine, diethylamine, dibutylamine, tetramethylenediamine, and tributylamine. Those which contain a sulfur atom include thiophenol, thiophene, ethyl 2-thiophene carboxylate, ethyl 3-thiophenecarboxylate, 2-methylthiophene, methylmercaptan, ethylmercaptan, isopropylmercaptan, butylmercaptan, diethylthioether, diphenylthioether, methyl benzenesulfonate, methyl sulfite, and ethyl sulfite. Those which contain an oxygen atom include tetrahydrofuran, 2-methyltetrahydrofuran, 3-methyltetrahydrofuran, 2-ethyltetrahydrofuran, dioxane, dimethyl ether, diethyl ether, dibutyl ether, diisoamyl ether, diphenyl ether, anisole, acetophenone, acetone, methyl ethyl ketone, acetyl acetone, ethyl 2-furoate, isoamyl 2-furoate, methyl 2-furoate, and propyl 2-furoate. Those which contain a phosphorus atom include triphenyl phosphine, tributyl phosphine, triphenyl phosphite, tribenzyl phosphite, diethyl phosphate, and diphenyl phosphate.

These electron donor compounds may be used in combination with one another. In addition, these electron donor compounds may be used when the catalyst component is used in combination with an organoaluminum compound. Alternatively, they may be used after previous contact with an organoaluminum compound.

The organoaluminum compound is used in an amount of 1 to 2000 gram mol, particularly 20 to 500 gram mol, for 1 gram atom of titanium in the catalyst component of this invention.

The ratio of the organoaluminum compound to the electron donor compound is such that one mol of the electron donor compound matches 0.1 to 40 gram atom, preferably 1 to 25 gram atom of aluminum in the organoaluminum compound.

Polymerization of Olefins

The catalyst composed of the catalyst component obtained as mentioned above and an organoaluminum compound (and an electron donor compound) is useful as a catalyst for homopolymerization of a monoolefin and copolymerization of a monoolefin with another monoolefin or a diolefin. It is an outstanding catalyst for homopolymerization of alpha-olefins, particularly $C_3$ to $C_6$ alpha-olefins, such as propylene, 1-butene, 4-methyl-1-pentene, and 1-hexene; for random and block copolymerization of the above-mentioned alpha-olefins with one another or with ethylene; for homopolymerization of ethylene; and for random or block copolymerization of ethylene with a $C_3$ to $C_{10}$ alpha-olefins such as propylene, 1-butene, 4-methyl-1-pentene, 1-hexene, and 1-octene.

The polymerization may be performed in either gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene; or in the liquid monomer. The polymerization temperature is usually −80° C. to +150° C., preferably 40° to 120° C. The polymerization pressure is 1 to 60 atm. The molecular weight modification of the resulting polymer is accomplished by the aid of hydrogen or any known molecular weight modifier present in the system. In the case of copolymerization, the quantity of an olefin to be copolymerized is usually less than 30 wt %, particularly 0.3 to 15 wt %, based on the principal olefin. The polymerization with the catalyst system of this invention may be performed continuously or batchwise under the commonly used conditions. The copolymerization may be accomplished in one step or in two or more steps.

Effect of the Invention

The catalyst component of this invention is effective for the production of polyolefins, particularly isotactic polypropylene, ethylene-propylene random copolymers, and ethylene-propylene block copolymers.

The polymerization catalyst containing the catalyst component of this invention has a high polymerization activity and high stereoregularity and keeps the high activity for a long period at the time of polymerization. In addition, it provides polyolefin powder having a high bulk density and good flowability.

The catalyst component of this invention exhibits its high activity and high stereoregularity even when the titanium content is low, the amount of organoaluminum compound is small at the time of polymerization, and the amount of electron donor compound is small. Therefore, it contributes to the reduction of residues of ash (aluminum etc.) and residues of electron donor compound in the resulting polymer. The resulting polymer gives off only a little odor at the time of molding and provides molded items which have good heat stability, good color characteristics, and high rigidity.

Examples

The invention is now described in more detail with reference to the following examples and application examples, which should not be construed to limit the scope of the invention. Percent (%) in the examples and application examples means wt %, unless otherwise indicated.

The heptane insolubles (abbreviated as HI hereinafter) which indicate the ratio of the crystalline phase in the polymer are the amount of the polymer which remains undissolved when the polymer is extracted with boiling n-heptane for 6 hours in a Soxhlet apparatus of improved type.

Melt flow rate (MFR) and melt index (MI) were measured according to ASTM D1238, and bulk density was measured according to ASTM D1895-69, method A.

EXAMPLE 1

Contacting of Magnesium Diethoxide with Trichlorosilane

In a 500-ml glass reactor equipped with a reflux condenser, dropping funnel, and stirrer, with the air therein thoroughly replaced with nitrogen, were placed 30.2 g (0.26 mol) of magnesium diethoxide and 100 ml of n-heptane. With stirring at room temperature, a mixture composed of 75 g (0.55 mol) of trichlorosilane and 30 ml of n-heptane was added dropwise from the dropping funnel over a period of 45 minutes, followed by stirring at 70° C. for 2 hours. During the stirring period, the reactants gave off a gas.

The resulting solids were filtered off at 70° C., washed with five 300-ml portions of n-hexane at 65° C., and dried in vacuo at 60° C. for 30 minutes. Thus there was obtained the solid component (I), which was found to contain 14% of magnesium, 11% of silicon, and 51% of chlorine, and have a specific surface area of 20 m²/g and pore volume of 0.05 cc/g.

In a 300-ml stainless steel (SUS 316) mill pot containing 100 pieces of stainless steel (SUS 316) ball, 12 mm in diameter, was placed 15.1 g of the solid component (I) under a nitrogen atmosphere. Then, 3.8 g of ethyl benzoate was added. The mill pot was shook for 1 hour on a shaker, whereby the contacting of the components was accomplished. Thus, there was obtained the solid component (II).

Treatment with titanium tetrachloride

In a 200-ml glass reactor equipped with a stirrer was placed 8.5 g of the solid component (II) under a nitrogen atmosphere. Then 40 ml of toluene and 60 ml of titanium tetrachloride were added, followed by stirring at 90° C. for 2 hours. The resulting solid substance was filtered off at 90° C., washed with seven 100-ml portions of n-hexane at 65° C., and dried in vacuo at 60° C. for 30 minutes. Thus, there was obtained the solid component (III), which was found to contain 2.6% of titanium, 19.0% of magnesium, 53.6% of chlorine, 2.7% of silicon, and 13.7% of ethyl benzoate, and have a specific surface area of 210 m²/g and a pore volume of 0.17 cc/g.

Treatment with hexachloroethane

In a 200-ml glass reactor equipped with a stirrer was placed 4.5 g of the solid component (III) under a nitrogen atmosphere. Then 4.2 g of hexachloroethane and 1200 ml of toluene were added, followed by stirring at 50° C. for 30 minutes. The resulting solid substance was filtered off at 50° C., washed with five 100-ml portions of n-hexane, and dried in vacuo at 60° C. for 30 minutes. Thus there was obtained a catalyst component, which was found to contain 1.6% of titanium, 19.8% of magnesium, 54.6% of chlorine, 2.8% of silicon, and 14.1% of ethyl benzoate.

EXAMPLES 2 TO 8

The catalyst components were prepared in the same manner as in Example 1 except that ethyl benzoate (as an electron donor compound) which was brought into contact with the solid component (I) was replaced by the compounds shown in Table 1. The compositions of the resulting catalyst components are also shown in Table 1.

TABLE 1

| Example | Electron Donor Compound | Content of titanium (%) | Content of electron donor (%) |
|---|---|---|---|
| 1 | Ethyl benzoate | 1.6 | 14.1 |
| 2 | Diisobutyl phthalate | 1.8 | 19.8 |
| 3 | Di-n-Butyl phthalate | 1.5 | 21.3 |
| 4 | Phthalic anhydride | 2.1 | 13.1 |
| 5 | Benzoic anhydride | 1.9 | 11.6 |
| 6 | Benzoyl chloride | 1.9 | 8.2 |
| 7 | Phthalic acid | 2.1 | 10.9 |
| 8 | Benzoic acid | 1.7 | 9.3 |

EXAMPLE 9

Contacting of magnesium diethoxide with trichlorosilane

In a 3-liter glass reactor, with the air therein thoroughly replaced with nitrogen, were placed 120 g of magnesium diethoxide and 680 ml of n-heptane. With stirring, a mixture composed of 356 g of trichlorosilane and 250 ml of n-heptane was added dropwise from the dropping funnel over a period of 45 minutes at room temperature. Stirring was continued at 70° C. for 6 hours. The resulting solids were filtered off at 70° C. and stirred with 600 ml of n-hexane at 65° C. for 10 minutes, and the supernatant liquid was removed by decantation. Washing with n-hexane was repeated five times. The solids were stirred with 600 ml of toluene at 65° C. for 10 minutes, and the supernatant liquid was removed by decantation. To the solids were added 30 of di-n-butyl phthalate and 400 ml of toluene, followed by stirring at 50° C. for 2 hours.

Treatment with titanium tetrachloride

Then, to the solids was added 960 ml of titanium tetrachloride, followed by stirring at 90° C. for 2 hours. The supernatant liquid was removed by decantation. Further, 1.4 liters of toluene was added, followed by stirring at 90° C. for 10 minutes. The supernatant liquid was removed. The washing with toluene was repeated twice. Further, 960 ml of titanium tetrachloride and 640 ml of toluene were added, followed by stirring at 90° C. for 2 hours. The resulting solid substance was filtered off at 90° C., washed with seven 1.4-liter portions of n-hexane at 65° C., and dried in vacuo at room temperature for 1 hour. Thus there was obtained 103 g of solid component (I), which was found to contain 2.5% of titanium, 16.2% of magnesium, 49% of chlorine, 3.1% of silicon, and 13.3% of di-n-butyl phthalate.

Treatment with hexachloroethane

In a 1-liter glass reactor was placed 10 g of the solid component (I), 3.2 g of hexachloroethane, and 300 ml of toluene under a nitrogen atmosphere.

After heating to 50° C., the contents were stirred for 1 hour, and the supernatant liquid was removed. The resulting solid substance was filtered off at room temperature, washed with five 300-ml portions of n-hexane, and dried in vacuo at room temperature for 1 hour. Thus there was obtained 9.1 g of catalyst component, which was found to contain 1.6% of titanium, 16.8% of magnesium, 48% of chlorine, 3.1% of silicon, and 14.1% of di-n-butyl phthalate.

EXAMPLES 10 TO 12

The catalyst components were prepared in the same manner as in Example 9 except that the silicon compound which was brought into contact with magnesium diethoxide was replaced by the compounds as shown in Table 2. The compositions of the resulting catalyst components are also shown in Table 2.

TABLE 2

| Example | Silicon Compound | Content of titanium (%) | Content of electron donor (%) |
|---|---|---|---|
| 10 | Methyldichlorosilane | 1.7 | 13.2 |
| 11 | Dimethylchlorosilane | 1.5 | 13.9 |
| 12 | Methyldiethoxysilane | 1.5 | 11.8 |

EXAMPLES 13 TO 19

The catalyst components were prepared in the same manner as in Example 9 except that the conditions for treatment with hexachloroethane were changed as shown in Table 3. The compositions of the resulting catalyst components are also shown in Table 3.

TABLE 3

| | Conditions for treatment | | | Compositions | |
|---|---|---|---|---|---|
| Example | Temp. (°C.) | Time (min) | $C_2Cl_6$/mg (mol/mol) | Content of Ti (%) | Content of electron donor (%) |
| 9 | 50 | 60 | 0.5 | 1.6 | 14.1 |
| 13 | 20 | 60 | 0.5 | 1.8 | 13.9 |
| 14 | 100 | 60 | 0.5 | 1.2 | 14.8 |
| 15 | 50 | 180 | 0.5 | 1.5 | 14.6 |
| 16 | 50 | 10 | 0.5 | 1.8 | 13.9 |
| 17 | 50 | 60 | 0.2 | 1.6 | 14.5 |
| 18 | 50 | 60 | 1.0 | 1.5 | 14.5 |
| 19 | 50 | 60 | 3.0 | 1.4 | 15.0 |

EXAMPLES 20 TO 27

The catalyst components were prepared in the same manner as in Example 9 except that hexachloroethane and toluene were replaced all together by one of halogenated hydrocarbons (Examples 20 to 25) shown in Table 4, hexachloroethane alone was replaced by hexabromoethane (Example 26), and toluene alone was replaced by 1,2-dichloroethane (Example 27). The compositions of the resulting catalyst components are also shown in Table 4.

TABLE 4

| Example | Halogenated hydrocarbon | Content of titanium (%) | Content of electron donor (%) |
|---|---|---|---|
| 20 | Methylchloroform | 2.0 | 13.9 |
| 21 | Chloroform | 1.9 | 14.2 |
| 22 | Carbon tetrachloride | 1.1 | 15.5 |
| 23 | 1,2-Dichloroethane | 1.4 | 14.9 |
| 24 | 1,1,2,2-Tetrachloroethylene | 1.8 | 14.0 |
| 25 | o-Dichlorobenzene | 1.3 | 12.8 |
| 26 | Hexabromoethane | 2.1 | 13.6 |
| 27 | Hexachloroethane/ 1,2-dichloroethane | 1.5 | 14.5 |

EXAMPLES 28 TO 30

The catalyst components were prepared in the same manner as in Example 9 except that hexachloroethane and toluene were replaced all together by one of the hydrocarbons shown in Table 5 and the treating temperature was changed from 50° C. to 100° C. The compositions of the resulting catalyst components are also shown Table 5.

TABLE 5

| Example | Hydrocarbon | Content of titanium (%) | Content of electron donor (%) |
|---|---|---|---|
| 28 | Xylene | 2.2 | 12.3 |
| 29 | Decalin | 2.3 | 11.8 |
| 30 | Tetralin | 2.1 | 12.0 |

EXAMPLES 31 TO 35

The catalyst components were prepared in the same manner as in Example 9 except that hexachloroethane was replaced by one of the metal halides shown in Table 6. The compositions of the resulting catalyst components are also shown in Table 6.

TABLE 6

| Example | Metal Halide | Content of titanium (%) | Content of electron donor (%) |
|---|---|---|---|
| 31 | SiCl₄ | 1.9 | 13.8 |
| 32 | SnCl₄ | 2.1 | 14.2 |
| 33 | AlCl₃ | 1.5 | 14.5 |
| 34 | BCl₃ | 1.6 | 13.9 |
| 35 | BBr₃ | 1.8 | 14.0 |

EXAMPLE 36

The catalyst component was prepared in the same manner Example 1 except that the solid component (I) was not brought into contact with ethyl benzoate. The resulting catalyst component was found to contain 2.6% of titanium, 19.8% of magnesium, 59.3% of chlorine, and 4.1% of silicon.

APPLICATION EXAMPLE 1

Polymerization of propylene

Into a 1.5-liter stainless steel (SUS 32) autoclave equipped with a stirrer was charged under a nitrogen atmosphere a mixture prepared by mixing the following constituents, followed by standing for 5 minutes. (a) 24.0 mg of the catalyst component obtained in Example 1. (b) 4.0 ml of n-heptane solution containing 0.1 mol of triethyl aluminum (abbreviated as TEAL hereinafter) in 1 liter of n-heptane (corresponding to 50 gram atom of aluminum for 1 gram atom of titanium in the catalyst component). (c) 1.2 ml of n-heptane solution containing 0.1 mol of ethyl p-methoxybenzoate (abbreviated as EPA hereinafter) in 1 liter of n-heptane (corresponding to 0.30 gram mol of EPA for 1 gram atom of aluminum in said TEAL). The 0.6 liters of hydrogen gas as a molecular weight modifier and 0.8 liters of liquefied propylene were forced into the autoclave. The reaction system was heated to 70° C. and the polymerization of propylene was carried out for 1 hour. After the polymerization was complete, unreacted propylene was purged. There was obtained 340.8 g of white polypropylene powder having an HI of 95.6% (heptane insolubles, an indication for the ratio of crystalline phase in the polymer), an MFR (melt flow rate) of 5.7, and a bulk density of 0.39 g/cm³. The amount (Kc) of the polymer produced per gram of the catalyst component was 14.2 kg, and the amount (Kt) of the polymer produced per gram of titanium in the catalyst component was 888 kg. The content of ash in the resulting polymer was as follows: Ti—1.1 ppm, Mg—14 ppm, Al—29 ppm, and Cl—38 ppm (by weight).

APPLICATION EXAMPLES 2 TO 8

The polymerization of propylene was carried out in the same manner as in Application Example 1 except that the catalyst components obtained in Examples 2 to 8 were used. The results are shown in Table 7. The catalyst component number in the following tables correspond to the example number in which the relevant catalyst component was prepared.

COMPARATIVE EXAMPLES 1 TO 3

The solid component (III) obtained in the same manner as in Example 1 was used as such for the catalyst component (comparative Example 1). The solid component (III) (containing 4.5% of titanium and 19.5% of diisobutyl phthalate) was prepared in the same manner as in Example 2, but it was not treated with hexachlorethane (Comparative Example 2). Using these solid components, the polymerization of propylene was carried out in the same manner as in Application Example 1. The results are shown in Table 7.

Also, the polymerization of propylene was carried out in the same manner as in Application Example 1 except that the solid component (III) obtained in Comparative Example 1 was used, and the amount of TEAL at the time of polymerization was changed to that corresponding to 310 gram atom of aluminum for 1 gram atom of titanium in the solid component (III) (Comparative Example 3). The results are shown in Table 7.

APPLICATION EXAMPLE 9

Into a 1.5-liter stainless steel autoclave, with the atmosphere therein thoroughly replaced with nitrogen, was charged under a nitrogen atmosphere a mixture prepared by mixing the following constituents, followed by standing for 5 minutes. (a) 15.7 mg of the catalyst component obtained in Example 9. (b) 2.6 ml of n-heptane solution containing 0.1 mol of TEAL in 1 liter of n-heptane (corresponding to 50 gram atom of aluminum for 1 gram atom of titanium in the catalyst component). (c) 2.6 ml of n-heptane solution containing 0.01 mol of phenyltriethoxysilane (abbreviated as PES) in 1 liter of n-heptane (corresponding to 0.1 gram mol of PES for 1 gram atom of aluminum in said TEAL). Then 100 ml (STP) of hydrogen gas and 1.0 liter of liquefied propylene were forced into the autoclave. The reaction system was heated to 70° C. and the polymerization of propylene was carried out for 1 hour. After the polymerization was complete, unreacted propylene was purged. There was obtained 254 g of powder having the following characteristic values. Kc—16.2 kg/g; Kt—1010 kg/g; HI—98.0%, MFR—8.3 g/10 min; and BD 0.39 g/cm³. The ash content in the polymer was as follows: Ti—1.0 ppm, Al—26 ppm, Mg—10 ppm, and Cl—32 ppm.

APPLICATION EXAMPLES 10 TO 35

The polymerization of propylene was carried out in the same manner as in Application Example 9 except that the catalyst components obtained in Examples 10 to 35 were used. The results are shown in Table 8.

COMPARATIVE EXAMPLE 4

The solid component (I) was prepared in the same manner as in Example 9. Using this solid component, the polymerization of propylene was carried out in the same manner as in Application Example 9. The results are shown in Table 8.

APPLICATION EXAMPLES 36 TO 40

The polymerization of propylene was carried out in the same manner as in Application Example 9 except that PES was replaced by one of the electron donor compounds shown in Table 9. The results are shown in Table 9.

APPLICATION EXAMPLES 41 TO 43

The polymerization of propylene was carried out in the same manner as in Application Example 2 except that EPA was replaced by one of the electron donor compounds shown in Table 9. In addition, in Application Example 42, TEAL was replaced by a 3:1 mixture (in mol) of TEAL and DEAC (diethylaluminum chloride), and in Application Example 43, TEAL was replaced by a 3:1 mixture (in mol) of triisobutyl aluminum and DEAC. The results are shown in Table 9.

COMPARATIVE EXAMPLES 5 TO 7

The polymerization of propylene was carried out in the same manner as in Comparative Example 4 except that PES was replaced by one of the electron donor compounds shown in Table 10. The results are shown in Table 10.

COMPARATIVE EXMAPLES 8 TO 10

The polymerization of propylene was carried out in the same manner as in Comparative Example 1 except that EPA was replaced by one of the electron donor compounds shown in Table 10. In addition, in Comparative Example 9, TEAL was replaced by a 3:1 mixture (in mol) of TEAL and DEAC, and in Comparative Example 10. TEAL was replaced by a 3:1 mixture (in mol) of triisobutyl aluminum and DEAC. The results are shown in Table 10.

COMPARATIVE EXAMPLE 11

The polymerization of propylene was carried out in the same manner as in Comparative Example 10 except that the amount of organoaluminum compound was changed to that corresponding to 300 gram atom for 1 gram atom of titanium in the solid component (III). The results are shown in Table 10.

APPLICATION EXAMPLE 44

Into a 3-liter autoclave, with the atmosphere therein thoroughly replaced with nitrogen, was charged a 12.5 mg of the catalyst component obtained in Example 9, 0.21 mmol of triethyl aluminum, and 0.021 mmol of phenyltriethoxysilane. Then 1.5 liters of hydrogen gas and 2 liters of liquefied propylene were forced into the autoclave. The homopolymerization of propylene was carried out with stirring at 70° C. for 1 hour. The resulting polypropylene was found to have an HI of 97.5%. After the polymerization was complete, unreacted propylene was purged, and the atmosphere in the autoclave was replaced by nitrogen gas. Then a mixture gas of ethylene and propylene (molar ratio of ethylene to propylene is 1.5) was admitted into the autoclave, and the copolymerization was carried out at 70° C. for 3 hours while supplying the mixture gas so that the pressure of monomer gas was maintained at 1.5 atm. After the polymerization was complete, unreacted mixture gas was purged from the reaction system, and thus there was obtained 412 g of propylene block copolymer.

The ratio of the copolymer fraction was calculated at 18.1% from the consumption of the mixed gas and the amount of the total polymer. The ethylene content in the total polymer obtained by infrared analysis was 8.9%. Thus the ethylene content in the copolymer fraction was 49%. The calculations from the amount of the total polymer and the consumption of the mixed gas indicate that one gram of the catalyst component formed 27.0 kg of propylene homopolymer and 6.0 kg of copolymer fraction. The resulting block copolymer had an MFR of 16.5 g/10 min and a bulk density of 0.39 g/cm$^3$. No coagulation of polymer particles occurred and no fouling was observed in the autoclave. The ash content in the polymer was as follows: Ti—0.5 ppm, Mg—7 ppm, Al—15 ppm, and Cl—16 ppm.

APPLICATION EXAMPLE 45

Polymerization of ethylene

Into a 1.5-liter stainless steel (SUS 32) autoclave equipped with a stirrer were charged under a nitrogen atmosphere 11.5 mg of the catalyst component obtained in Example 36, 0.3 mmol of triisobutyl aluminum, and 700 ml of isobutane. The polymerization system was heated to 85° C. Hydrogen was introduced into the autoclave until the partial pressure of hydrogen reached 2 kg/cm$^2$, and then ethylene was admitted until the partial pressure of ethylene reached 5 kg/cm$^2$. Polymerization was carried out for 60 minutes while supplying ethylene continuously so that the total pressure of the polymerization system was kept constant. After the polymerization was complete, the solvent and unreacted ethylene were purged from the polymerization system. The resulting white powdery polymer was dried in vacuo at 70° C. for 10 hours. Thus there was obtained 253 g of polyethylene powder having an MI of 3.5 g/10 min and bulk density of 0.34 g/cc. Kc was 22.0 kg/g and Kt was 846 kg/g. The ash content in the polymer was as follows: Ti—1.1 ppm, Mg—9 ppm, Al—30 ppm, and Cl—25 ppm.

COMPARATIVE EXAMPLE 12

Example 36 was repeated except that the treatment with hexachloroethane was not performed, to give a catalyst component containing 5.8% of titanium, 16.4% of magnesium, 60.1% of chlorine, and 3.1% of silicon. Using this catalyst component, the polymerization of ethylene was carried out in the same manner as in Application Example 45. Kc was 14.5 kg/g and Kt was 250 kg/g. The resulting polymer had an MI of 2.9 g/10 min and a bulk density of 0.34 g/cm$^3$. The ash content was as follows: Ti—4 ppm, Mg—12 ppm, Al—61 ppm, and Cl—46 ppm.

TABLE 7

| Application Example | Catalyst component | Catalyst Efficiency | | Polymer properties | | | Ash content (ppm) | | | |
|---|---|---|---|---|---|---|---|---|---|---|
| | | Kc (kg/g) | Kt (kg/g) | HI (%) | MFR (g/10 min) | BD (g/cm$^3$) | Ti | Mg | Al | Cl |
| 1 | 1 | 14.2 | 888 | 95.6 | 5.7 | 0.39 | 1.1 | 14 | 29 | 38 |
| 2 | 2 | 13.6 | 756 | 97.3 | 3.7 | 0.41 | 1.3 | 11 | 38 | 33 |
| 3 | 3 | 15.7 | 1047 | 97.5 | 6.2 | 0.38 | 1.0 | 10 | 27 | 28 |
| 4 | 4 | 11.8 | 562 | 96.3 | 5.4 | 0.36 | 1.7 | 14 | 46 | 40 |
| 5 | 5 | 8.9 | 468 | 95.2 | 3.8 | 0.37 | 2.0 | 22 | 56 | 60 |
| 6 | 6 | 9.2 | 484 | 94.6 | 6.4 | 0.35 | 2.0 | 24 | 51 | 63 |
| 7 | 7 | 11.3 | 538 | 96.0 | 5.3 | 0.36 | 1.8 | 17 | 50 | 48 |
| 8 | 8 | 9.0 | 529 | 94.8 | 2.1 | 0.38 | 1.8 | 24 | 49 | 65 |
| Comparative Example 1 | | 8.3 | 319 | 92.5 | 8.1 | 0.34 | 3.3 | 23 | 90 | 66 |
| Comparative Example 2 | | 10.0 | 222 | 93.9 | 5.1 | 0.40 | 4.4 | 17 | 115 | 48 |
| Comparative | | 14.0 | 538 | 95.3 | 2.9 | 0.39 | 1.7 | 14 | 285 | 37 |

TABLE 7-continued

| Application Example | Catalyst component | Catalyst Efficiency Kc (kg/g) | Kt (kg/g) | HI (%) | MFR (g/10 min) | BD (g/cm³) | Ash content (ppm) Ti | Mg | Al | Cl |
|---|---|---|---|---|---|---|---|---|---|---|
| Example 3 | | | | | | | | | | |

TABLE 8

| Application Example | Catalyst component | Kc (kg/g) | Kt (kg/g) | HI (%) | MFR (g/10 min) | BD (g/cm³) | Ti | Mg | Al | Cl |
|---|---|---|---|---|---|---|---|---|---|---|
| 9 | 9 | 16.2 | 1010 | 98.0 | 8.3 | 0.39 | 1.0 | 10 | 26 | 32 |
| 10 | 10 | 12.2 | 718 | 96.3 | 4.5 | 0.37 | 1.3 | 14 | 35 | 40 |
| 11 | 11 | 11.0 | 733 | 96.3 | 9.1 | 0.39 | 1.4 | 14 | 35 | 45 |
| 12 | 12 | 12.5 | 833 | 95.9 | 5.8 | 0.37 | 1.1 | 12 | 30 | 34 |
| 13 | 13 | 19.0 | 1056 | 98.0 | 8.1 | 0.40 | 1.0 | 9 | 29 | 25 |
| 14 | 15 | 13.8 | 1150 | 98.1 | 5.3 | 0.40 | 0.8 | 12 | 21 | 36 |
| 15 | 15 | 18.1 | 1207 | 98.1 | 11.6 | 0.41 | 0.8 | 10 | 23 | 27 |
| 16 | 16 | 16.3 | 906 | 97.5 | 9.9 | 0.39 | 1.2 | 10 | 33 | 33 |
| 17 | 17 | 17.5 | 1094 | 97.6 | 4.9 | 0.37 | 1.0 | 9 | 27 | 26 |
| 18 | 18 | 20.3 | 1353 | 98.2 | 10.1 | 0.41 | 0.8 | 8 | 19 | 23 |
| 19 | 19 | 16.9 | 1207 | 98.0 | 6.7 | 0.37 | 0.8 | 10 | 24 | 30 |
| 20 | 20 | 12.5 | 625 | 97.3 | 11.3 | 0.37 | 1.5 | 14 | 40 | 35 |
| 21 | 21 | 11.3 | 595 | 97.1 | 14.0 | 0.37 | 1.7 | 16 | 46 | 43 |
| 22 | 22 | 10.0 | 909 | 97.6 | 9.9 | 0.39 | 1.1 | 17 | 31 | 49 |
| 23 | 23 | 13.1 | 936 | 97.9 | 18.2 | 0.39 | 1.1 | 13 | 29 | 37 |
| 24 | 24 | 15.2 | 844 | 97.8 | 12.1 | 0.36 | 1.1 | 11 | 36 | 33 |
| 25 | 25 | 11.1 | 854 | 98.0 | 8.6 | 0.40 | 1.2 | 15 | 33 | 45 |
| 26 | 26 | 14.9 | 710 | 97.5 | 14.2 | 0.36 | 1.5 | 10 | 41 | 30 |
| 27 | 27 | 18.2 | 1213 | 98.1 | 8.3 | 0.42 | 0.8 | 9 | 22 | 26 |
| 28 | 28 | 16.5 | 750 | 97.4 | 9.6 | 0.37 | 1.3 | 14 | 35 | 30 |
| 29 | 29 | 14.8 | 643 | 97.1 | 11.0 | 0.38 | 1.6 | 13 | 40 | 34 |
| 30 | 30 | 13.9 | 662 | 97.2 | 8.8 | 0.35 | 1.6 | 12 | 43 | 33 |
| 31 | 31 | 16.9 | 889 | 97.3 | 6.4 | 0.38 | 1.1 | 11 | 30 | 33 |
| 32 | 32 | 13.2 | 629 | 97.1 | 5.1 | 0.36 | 1.4 | 14 | 38 | 38 |
| 33 | 33 | 18.9 | 1260 | 97.8 | 10.1 | 0.39 | 0.8 | 9 | 20 | 25 |
| 34 | 34 | 12.2 | 763 | 97.6 | 3.2 | 0.38 | 1.3 | 15 | 35 | 40 |
| 35 | 35 | 10.5 | 583 | 97.1 | 4.8 | 0.36 | 1.6 | 13 | 46 | 33 |
| Comparative Example 4 | | 15.8 | 632 | 96.5 | 4.8 | 0.38 | 1.6 | 13 | 46 | 33 |

TABLE 9

| Application Example | Electron donor compound Name [B] | Al/B (in mol) | Kc (kg/g) | Kt (kg/g) | HI (%) | MFR (g/10 min) | BD (g/cm³) | Ti | Mg | Al | Cl |
|---|---|---|---|---|---|---|---|---|---|---|---|
| 36 | Phenyltrimethoxysilane | 10 | 21.5 | 1343 | 98.1 | 10.1 | 0.39 | 0.7 | 8 | 20 | 23 |
| 37 | Diphenyldimethoxysilane | 10 | 24.8 | 1550 | 97.7 | 9.8 | 0.38 | 0.6 | 7 | 17 | 21 |
| 38 | phenylmethyldimethoxysilane | 10 | 22.0 | 1375 | 97.9 | 8.1 | 0.38 | 0.7 | 8 | 19 | 25 |
| 39 | 2,2,6,6-tetramethyl-piperidine (TMPIP) | 3 | 33.3 | 2081 | 96.0 | 1.2 | 0.35 | 0.5 | 5 | 14 | 13 |
| 40 | Methyl p-toluate (MPT) / TMPIP | 3 / 3 | 25.5 | 1594 | 98.3 | 1.0 | 0.42 | 0.6 | 6 | 20 | 20 |
| 41 | MPT / TMPIP | 3 / 3 | 23.2 | 1450 | 96.9 | 2.3 | 0.36 | 0.7 | 8 | 19 | 24 |
| 42 | MPT / TMPIP | 3 / 3 | 22.4 | 1400 | 96.7 | 0.8 | 0.38 | 0.7 | 9 | 21 | 32 |
| 43 | EPA / TMPIP | 3 / 3 | 32.5 | 2031 | 95.6 | 1.1 | 0.35 | 0.5 | 6 | 15 | 30 |

TABLE 10

| Comparative Example | Electron donor compound Name [B] | Al/B (in mol) | Kc (kg/g) | Kt (kg/g) | HI (%) | MFR (g/10 min) | BD (g/cm³) | Ti | Mg | Al | Cl |
|---|---|---|---|---|---|---|---|---|---|---|---|
| 5 | Phenyltrimethoxysilane | 10 | 22.0 | 916 | 96.6 | 8.2 | 0.37 | 1.2 | 7 | 29 | 22 |
| 6 | TMPIP MPT | 3 3 | 25.4 | 1058 | 94.3 | 0.9 | 0.34 | 1.0 | 6 | 28 | 20 |

TABLE 10-continued

| Comparative Example | Electron donor compound Name [B] | Al/B (in mol) | Catalyst Efficiency Kc (kg/g) | Kt (kg/g) | Polymer properties HI (%) | MFR (g/10 min) | BD (g/cm³) | Ash content (ppm) Ti | Mg | Al | Cl |
|---|---|---|---|---|---|---|---|---|---|---|---|
| 7 | TMPIP | 3 | 21.1 | 879 | 96.8 | 1.7 | 0.36 | 1.1 | 8 | 28 | 22 |
| 8 | MPT | 3 | 17.5 | 673 | 94.9 | 2.2 | 0.36 | 1.5 | 11 | 41 | 30 |
|   | TMPIP | 3 |      |     |      |     |      |     |    |    |    |
| 9 | MPT | 3 | 20.9 | 804 | 95.4 | 1.8 | 0.34 | 1.2 | 9 | 35 | 34 |
|   | TMPIP | 3 |     |     |      |     |      |     |    |    |    |
| 10 | EPA | 3 | 24.2 | 931 | 94.6 | 0.9 | 0.33 | 0.9 | 8 | 31 | 30 |
|    | TMPIP | 3 |    |     |      |     |      |     |    |    |    |
| 11 | EPA | 3 | 20.3 | 810 | 96.5 | 2.0 | 0.37 | 2.0 | 12 | 209 | 89 |
|    | TMPIP | 3 |    |     |      |     |      |     |    |    |     |

What is claimed is:

1. A catalyst component for the polymerization of olefins which is prepared by contacting a product obtained by contacting (A) Mg(OR(OR'), (B) a silicon compound having at least one silicon-hydrogen bond, and (C) a divalent, trivalent or tetravalent titanium compound selected from titanium halides, alkoxy titanium compounds and haloalkoxy titanium compounds, with (D) one of (a) a hydrocarbon, (b) a halogenated hydrocarbon, (c) a halide of a metal selected from the metals of Groups IIIa, IVa and Va of the Periodic Table, or mixtures thereof, wherein R and R', which may be the same or different, are radicals selected from alkyl, alkenyl, cycloalkyl, aryl and aralkyl radicals.

2. The catalyst component of claim 1 wherein the (A) magnesium compound and the (B) silicon compound are contacted with each other and the product therefrom is contacted with the (C) titanium compound.

3. The catalyst component of claim 1 wherein (E) an electron donor compound is contacted with the (A) magnesium compound, the (B) silicon compound, and the (C) titanium compound.

4. A catalyst component for polymerizing alpha-olefins obtained by contacting a product obtained by contacting (A) Mg(OR) (OR'), (B) a silicon compound having at least one silicon-hydrogen bond, (C) a divalent, trivalent, or tetravalent titanium compound selected from titanium halides and alkoxy titanium halides, and (E) an electron donor selected from a carboxylic acid, a carboxylic acid ester, a carboxylic acid anhydride and a carboxylic acid halide, with (D) one of (a) a hydrocarbon, (b) a halogenerated hydrocarbon, (c) a halide of a metal selected from the metals of Groups IIIa, IVa and Va of the Periodic Table, or mixtures thereof, wherein R and R', which may be the same or different, are radicals selected from alkyl, alkenyl, cycloalkyl, aryl and aralkyl radicals.

5. The catalyst component of claim 4 wherein the titanium compound is terravalent.

6. The catalyst component of claim 5 wherein the (A) magnesium compound and the (B) silicon compound are contacted together and the product therefrom is contacted with the (E) electron donor compound and thereafter contacted with the (C) titanium compound.

7. The catalyst of claim 6 wherein the electon donor is selected from the group consisting of ethyl benzoate, diisobutylphthalate, di-n-butylphthalate, phthalic anhydride, phthalic acid, and phthaloylchloride.

8. The catalyst component of claim 4 wherein R and R' are alkyl radicals having from one to eight carbon atoms, (B) the silicon compound is a hydrosilane represented by the formula $H_mR_n{}^1SiX_r$, wherein R is a hydrocarbon group, $R^2O-$, $R^3R^4N-$, or $R^5COO$, X is a halogen atom, wherein the hydrocarbon groups represented by $R^1$, $R^2$, $R^3$, $R^4$ and $R^5$ and $C_1$ to $C_{16}$ alkyl, alkenyl, cycloalkyl, aryl and aralkyl groups, m is an integer of 1 to 3, $0 \leq r \leq 4$, and $m+n+r=4$, (E) the electron donor is an alkyl ester of an aromatic carboxylic acid and (C) the titanium compound is $TiCl_4$.

9. The catalyst component of claim 8 wherein R and R' are ethyl and r is an integer of 1 to 3.

10. The catalyst component of claim 9 wherein the hydrosilane is selected from trichlorosilane, $H_2SiCl_2$, methyldichlorosilane, ethyldichlorosilane, tertiary butyldichlorosilane, phenyldichlorosilane, dimethylchlorosilane, diisopropylchlorosilane, ethylchlordihydrosilane, n-butylchlorodihydrosilane, toluylchlorodihydrosilane, and diphenylchlorosilane.

11. The catalyst component of claim 10 wherein the hydrosilane is selected from trichlorosilane, dichloromethylsilane, and dimethylchlorosilane.

12. The catalyst component of claim 4 wherein component (D) is selected from hexachloroethane, hexabromoethane, 1,2-dichloroethane, xylene, decalin, $SiCl_4$, $AlCl_3$, and $BCl_3$.

13. A catalyst for the polymeriaation of olefins, said catalyst comprising (i) the catalyst component of claim 1 and (ii) an organoaluminum co-catalyst represented by the formula $R''_yAlX'_{3-y}$, wherein R" is an alkyl group or an aryl group, wherein X' is a halogen atom, alkoxy group, or hydrogen atom and y is a number in the range of $1 \leq y \leq 3$.

14. A catalyst for the polymerization of olefins, said catalyst comprising (i) the catalyst component of claim 4 and (ii) an organoaluminum co-catalyst represented by the formula $R''_yAlX'_{3-y}$, wherein R" is an alkyl group or an aryl group, wherein X' is a halogen atom, alkoxy group, or hydrogen atom and y is a number in the range of $1 \leq y \leq 3$.

15. A catalyst for the polymerization of olefins, said catalyst comprising (i) a catalyst component obtained by contacting a product obtained by contacting (A) Mg(OR)(OR'), (B) a silicon compound having at least one silicon-hydrogen bond, (C) a divalent, trivalent, or tetravalent titanium compound selected from titanium halides and alkoxy titanium halides, and (E) an electron donor selected from a carboxylic acid, a carboxylic acid ester, a carboxylic acid anhydride and a carboxylic acid halide, with (D) one of (a) a hydrocarbon, (b) a halogenated hydrocarbon, (c) a halide of a metal selected from the metals of Groups IIIa, IVa and Va of the Periodic Table, or mixtures thereof, wherein R and R' which may be the same or different, are radicals selected from alkyl, alkenyl, cycloalkyl, aryl and aralkyl radicals, and (ii) an organoluminum co-catalyst represented by the formula $R''_y AlX'_{3-y}$, wherein R'' is an alkyl group or an aryl group, wherein X' is a halogen atom, alkoxy group, or hydrogen atom and y is a number in the range of $1 \leq y \leq 3$.

16. The catalyst in accordance with claim 15 wherein the titanium compound is tetravalent.

17. The catalyst in accordance with claim 16 wherein the (A) magnesium compound and the (B) silicon compound are contacted together and the product therefrom is contacted with the (E) electron donor compound and thereafter contacted with the (C) titanium compound.

18. The catalyst in accordance with claim 17 wherein the (E) electron donor is selected from the group consisting of ethyl benzoate, diisobutylphthalate, di-n-butylphthalate, phthalic anhydride, phthalic acid, and phthaloylchloride.

19. The catalyst in accordance with claim 15 wherein R and R' are alkyl radicals having from one to eight carbon atoms, the catalyst component of claim 4 wherein R and R' are alkyl radicals having from one to eight carbon atoms, (B) the silicon compound is a hydrosilane represented by the formula $H_m R_n^1 SiX_r$, wherein $R^1$ is a hydrocarbon group, $R^2O-$, or $R^3R^4N-$, or $R^5COO$, X is a halogen atom, wherein hydrocarbon groups represented by $R^1$, $R^2$, $R^3$, $R^4$ and $R^5$ are $C_1$ to $C_{16}$ alkyl, alkenyl, cycloalkyl, aryl and aralkyl groups, m is an integer of 1 to 3, $0 \leq r < 4$, and $m+n+r=4$, (E) the electron donor is an alkyl ester of an aromatic carboxylic acid and (C) the titanium compound is $TiCl_4$.

20. The catalyst in accordance with claim 19 wherein R and R' are ethyl and r is integer of 1 to 3.

21. The catalyst in accordance with claim 20 wherein the hydrosilane is selected from trichlorosilane, $H_2SiCl_2$, methyldichlorosilane, ethyldichlorosilane, tertiary butyldichlorosilane, phenyldichlorosilane, dimethylchlorosilane, diisopropylchlorosilane, ethylchlorodihydrosilane, n-butylchlorodihydrosilane, toluylchlorodihydrosilane, and diphenylchlorosilane.

22. The catalyst in accordance with claim 21 wherein the hydrosilane is selected from trichlorosilane, trichloromethylsilane, and dimethylchlorosilane.

23. The catalyst in accordance with claim 15 wherein the component (D) is selected from hexachlorethane, hexabromoethane, 1,2,dichloroethane, xylene, decalene, $SiCl_4$, $AlCl_3$ and $BCl_3$.

24. The catalyst in accordance with claim 15 wherein the organoaluminum compound is selected from diethylaluminum chloride and triethylaluminum and mixtures thereof.

25. The catalyst in accordance with claim 24 further containing (iii) an electron donor selected from phenyltriethoxyisilane, phenyltrimethoxysilane, diphenyldimethoxysilane, phenylmethyldimethoxylsilane, 2,2,6,6,tetramethylpiperidine, methyl p-toluate, ethyl p-anisate, and ethyl p-methoxybenzoate.

* * * * *

UNITED STATES PATENT OFFICE
CERTIFICATE OF CORRECTION

Patent No. 4,678,768    Dated    July 7, 1987

Inventor(s)  M. Fujita, M. Miyazaki, M. Kizaki, Y. Nagashima, Y. Shimbori

It is certified that error appears in the above-identified patent and that said Letters Patent are hereby corrected as shown below:

From Claim 19, lines 3-6, please delete the phrase "the catalyst component of claim 4 wherein R and R' are alkyl radicals having from one to eight carbon atoms,".

Signed and Sealed this

Twenty-eighth Day of June, 1988

*Attest:*

DONALD J. QUIGG

*Attesting Officer*    *Commissioner of Patents and Trademarks*